United States Patent [19]

Calemma et al.

[11] Patent Number: 4,746,442
[45] Date of Patent: May 24, 1988

[54] PROCESS FOR THE REMOVAL OF METALS FROM WATERS CONTAINING THEM

[75] Inventors: Vincenzo Calemma; Roberto Menicagli; Riccardo Rausa, all of San Donato Milanese, Italy

[73] Assignee: Eniricerche S.p.A., Milan, Italy

[21] Appl. No.: 22,265

[22] Filed: Mar. 5, 1987

[30] Foreign Application Priority Data

Mar. 14, 1986 [IT] Italy .............................. 19765 A/86

[51] Int. Cl.[4] ................................................ C02F 1/62
[52] U.S. Cl. .................................... 210/725; 210/730; 210/912
[58] Field of Search ............... 210/688, 716, 724, 730, 210/912-914, 725

[56] References Cited

U.S. PATENT DOCUMENTS 3,872,002 3/1975 Musgrove ....................... 210/730 X
3,932,494 1/1976 Yoshida et al. ................. 210/688 X
3,948,791 4/1976 Tominanga et al. ........... 210/688 X Primary Examiner—Tom Wyse
Attorney, Agent, or Firm—Hedman, Gibson, Costigan & Hoare

[57] ABSTRACT

A process is disclosed for the removal of metals from waters containing them, comprising the treatment of the waters with an aqueous solution of alkaline salts of humic acids, which is characterized in that said solution is obtained by the dry oxidation of coal by oxygen or mixtures of oxygen and nitrogen, in particular air, and the subsequent extraction of the raw oxidation product by an alkaline solution, and that said aqueous solution is added to into the waters as such, wherein the humic acids salts perform a flocculating action, with the end pH being preliminarily to a value comprised within the range of from 1.5 to 5.5.

6 Claims, No Drawings

PROCESS FOR THE REMOVAL OF METALS FROM WATERS CONTAINING THEM

The present invention relates to a process for the removal of metals from waters containing them, by means of regenerated humic acids.

The absorption or complexation of metals by humic substances has been an important subject of investigation from many years.

This subject is considerably interesting from the practical point of view, due to the importance of the problem of waste waters pollution by highly toxic heavy metals.

The humic substances, in particular humic acids, have peculiar characteristics in terms of functional groups and of molecular mass, which may play a basic role in the formation of metal humic acid salts, so to allow the removal of particular pollutants present in waste waters.

From a general view point, the same definition of "humic acid" term has given rive to a wide discussion. Also the investigation into the structure of this class of substances has led to not-univocal interpretations, due to the complexity and the variability of the matter under investigation.

This is, in fact, a heterogeneous class of macromolecular organic acids which are formed by the degradation by microorganisms of vegetables constituents (lignin) under aerobial conditions, and which can be extracted from soils, lignites, etc., or which can be obtained from coal, by oxidative degradation, using different oxidants, such as $O_2$, $KMnO_4$, $HNO_3$, etc.

In such a case, the humic acids are defined as "regenerated"—and, although they probably differ, from a structural point of view, from those of natural origin, have a marked resemblance with them as to elemental composition, properties, functional groups.

In any case, they are a complex mixture of hydroaromatic macromolecular acids, insoluble at low pH values, and which contain oxygenated groups of different nature (carboxy groups, hydroxy groups, quinones, etc.), by means of which they can interact with metal ions, hydroxy groups, oxides, minerals.

The ability to retain the metals shown by the humic acids has given rise to a great interest both in view of an industrial application (water treatment, soil conditioning, hydrometallurgy), and in purely fundamental works aiming to study their stability constants, the kinetics of the mechanism of formation of humic acid-metal "complexes".

Their exchange capacity, as measured with calcium acetate, is around 4–6 meq/g, but the retention of metals is generally greater than that, because, besides the true exchange mechanisms supported by the acidic groups (COOH), other phenomena are active, both of chemical (chelation) and physical type (adsorption due to the formation of hydrogen bonds, Van der Waals' forces, etc.).

Such a capacity may be furthermore magnified by the presence of particular sites favouring the metal chelation, and which, with good probability, are present in substrates deriving from coal oxidation.

This capability has been exploited for the removal of materials from waste waters by processes based on the use of humic acids in solid phase as cation exchange resins.

The optimization of these processes requires the search for a compromise between the solubility of said humic acids in the reaction environment and their "activation", which takes place through the partial salification of the acidic groups, the purpose of which is to increase the exchange rate.

We may therefore state that to date the humic acids have been only used as cation exchange resins.

The partial salification of humic acids limits severely the potentiality of these compounds, in as much as it is to the detriment of the exchange rate with the metal cations.

It is known that in the removal of metals, the use of cation exchange resins is severely limited due to factors inherent in the physical nature of the substrate, by such factors the poor mechanical strength, the tendency to get dissolved, the packings and the regeneration difficulty being meant.

It has been now surprisingly found that the use of regenerated humic acids completely dissolved in alkaline solutions, and/or the use of their salts, used as such in homogeneous phase, allows obviating the above mentioned problems, with at the same time high removal capacities being obtained.

In fact, in this case the humic acids exploit the flocculating power for removing the metals, and, furthermore, the complete salification thereof allows high exchange rates.

The process according to the present invention comprises the treatment of waters containing the metals to be removed with an aqueous solution of alkaline salts of humic acids, and is characterized in that said solution is obtained from the dry oxidation of coal by oxygen or mixtures of oxygen and nitrogen, in particular air, carried out at a temperature comprised within the range of from 120° to 350° C., under an oxygen partial pressure comprised within the range of from 0.1 to 10 abs.atm, preferably of from 0.1 to 5 abs.atm, and for a contact time comprised within the range of from 15 to 600 minutes, and the subsequent extraction of the raw oxidation product by an alkaline solution, and that said aqueous solution is added to the waters as such, wherein the humic acids salts perform a flocculating action, with the end pH being preliminarily adjusted to a value comprised within the range of from 1.5 to 5.5.

It must be however pointed out that at pH values higher than 4 the analytical data relating to the retention may be distorted due to the formation of insoluble hydroxides.

The starting coals, from which the humic acids used in the process according to the invention are obtained, are preferably selected from those ranging from lignite to bituminous coals.

For humic acids obtained from lignite, the oxidation is preferably carried out at a temperature comprised within the range of from 150° to 225° C., under a partial pressure of oxygen comprised within the range of from 0.1 to 2 abs.atm, and for a contact time comprised within the range of from 15 minutes to 360 minutes.

For humic acids obtained from sub-bituminous coals, the oxidation is preferably carried out at a temperature comprised within the range of from 175° to 250° C., under a partial pressure of oxygen comprised within the range of from 0.5 to 3 abs.atm, and for a contact time comprised within the range of from 15 minutes to 360 minutes.

For humic acids obtained from bituminous coals, the oxidation is preferably carried out at a temperature comprised within the range of from 220° to 300° C., under a partial pressure of oxygen comprised within the range of from 1 to 5 abs.atm, and for a contact time comprised within the range of from 15 minutes to 360 minutes.

The metals which can be removed by adopting the process claimed by the present Applicant are in the form of salts soluble in water in an acidic medium, preferably belonging to groups III A, IV A, V A, VI A, VII A, VIII A, I B and II B, or of salts soluble in water in an acidic medium of tin, lead, aluminum, selenium, indium and thallium.

The following examples are supplied to the purpose of better illustrating the invention, without being a limitation thereof.

EXAMPLE 1

In the present example, the preparation of regenerated humic acids is disclosed.

The regenerated humic acids are obtained by the dry-phase oxidation by oxygen, of a coal of sub-bituminous type.

The oxidation is carried out by adding to the reactor 30 g of ground coal ($-250+106$ μm), and heating it to a temperature lower by about 50° C. than the prefixed temperature, with a nitrogen stream being fed.

After the completion of this preliminary step, the nitrogen flow is discontinued and the reaction is started by feeding air.

The exothermicity of the reaction makes coal temperature rise, and when said temperature reaches the prefixed value, it is kept constant by temperature control means, the sensor of which is introduced inside coal.

The extraction of humic acids formed during the reaction is performed by dispersing the oxidized coal in an alkaline solution, and keeping said dispersion heated at boiling temperature for 2 hours, after which the residue is removed by centrifugation.

EXAMPLE 2

To a 200-cc tared flask, such an aliquot of waste liquor is added, that, after subsequent dilution to the tared volume, it contains a concentration of copper(III) ion of $30 \times 10^{-3}$M.

To the metal-containing waste liquor, an aliquot of aqueous solution containing 1 g of sodium humate is added.

The contents of the flask are poured into a beaker, wherein the adjustment of pH value to the desired value, i.e., 2.5, is carried out, by (0.1N) NaOH and HCl solutions, with the solution being kept strongly stirred.

The contents of the beaker is poured again into the flask, and is diluted to the tared volume. The suspension is allowed to reach the equilibrium conditions up to complete decantation, and formation of a clear surnatant.

An aliquot of the contents is drawn from the tared flask, and is centrifuged for 20 minutes at 13,000 rpm.

The copper(III) ion concentration as determined (on the clear surnatant obtained by centrifugation) by atomic absorption, is to be considered as the concentration of the above element not retained by humic acids.

The retention percentage by weight is 88.

EXAMPLE 3-5

In Table 1, the values are reported of the retention percentages by weight relating to other tests carried out by replacing the copper-containing waste liquor with cadmium, chrome and manganese ions, so to have, in this case too, a concentration of $3 \times 10^{-3}$M.

The desired end pH of the solution is 2.5.

EXAMPLES 6-9

In Table 1, the values of retention percentages by weight are also reported, which relate to the above-used metal cations, as obtained by varying, as compared to the preceding examples, the end solution pH value (pH 5).

COMPARISON EXAMPLES (10-17)

In Table 2, the values of retention percentages by weight are reported, which were obtained by repeating the above Examples 2-9, by replacing the regenerated humic acids with natural humic acids.

A considerable decrease of the percentage by weight of retained product may be observed.

TABLE 1

| Examples | Metal Cation | Molarity $10^{-3}$ | pH Value | Retained % by Weight |
|---|---|---|---|---|
| 2 | $Cu^{2+}$ | 30 | 2.5 | 88 |
| 3 | $Cd^{2+}$ | 30 | 2.5 | 66 |
| 4 | $Cr^{3+}$ | 30 | 2.5 | 81 |
| 5 | $Mn^{2+}$ | 30 | 2.5 | 39 |
| 6 | $Cu^{2+}$ | 30 | 5 | 96 |
| 7 | $Cd^{2+}$ | 30 | 5 | 81 |
| 8 | $Cr^{3+}$ | 30 | 5 | 99 |
| 9 | $Mn^{2+}$ | 30 | 5 | 61 |

TABLE 2

| Examples | Metal Cation | Molarity $10^{-3}$ | pH Value | Retained % by Weight |
|---|---|---|---|---|
| 10 | $Cu^{2+}$ | 30 | 2.5 | 18 |
| 11 | $Cd^{2+}$ | 30 | 2.5 | 38 |
| 12 | $Cr^{3+}$ | 30 | 2.5 | 6 |
| 13 | $Mn^{2+}$ | 30 | 2.5 | 24 |
| 14 | $Cu^{2+}$ | 30 | 5 | 66 |
| 15 | $Cd^{2+}$ | 30 | 5 | 60 |
| 16 | $Cr^{3+}$ | 30 | 5 | 69 |
| 17 | $Mn^{2+}$ | 30 | 5 | 36 |

We claim:

1. A process for the removal of metals from waters containing them, comprising treating the waters with an aqueous solution of alkaline salts of humic acids, wherein said solution is obtained by the dry oxidation of coal with oxygen or mixtures including oxygen and nitrogen, carried out at a temperature of from 120° to 350° C., under an oxygen partial pressure of from 0.1 to 10 abs. atm, for a contact time of from 15 to 600 minutes, and thereafter extracting the raw oxidation product with an alkaline solution; said aqueous solution being introduced into the waters, wherein the humic acid salts perform a flocculating action, with the pH being adjusted to a value within the range of from 1.5 to 5.5.

2. A process according to claim 1, wherein the partial pressure of oxygen is from 0.1 to 5 abs. atm.

3. A process according to claim 1, wherein the coal from which the humic acids are obtained is selected from coals ranging from lignite to bituminous coals.

4. A process according to claim 3, wherein the coal is lignite, and the oxidation is carried out at a temperature of from 150° to 225° C., under a partial pressure of oxygen of from 0.1 to 2 abs.atm, and for a contact time of from 15 minutes to 360 minutes.

5. A process according to claim 3, wherein the coal is a sub-bituminous coal, and the oxidation is carried out at a temperature of from 175° to 250° C., under a partial pressure of oxygen of from 0.5 to 3 abs.atm, and for a contact time of from 15 minutes to 360 minutes.

6. A process according to claim 3, wherein the coal is a bituminous coal, and the oxidation is carried out at a temperature of from 220° to 300° C., under a partial pressure of oxygen of from 1 to 5 abs.atm, and for a contact time of from 15 minutes to 360 minutes.

* * * * *